Figure 1:
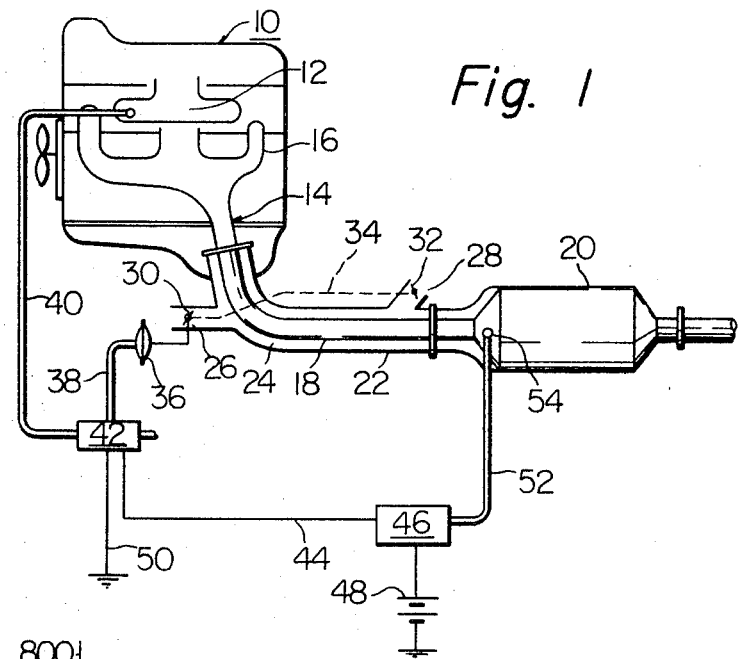

United States Patent [19]
Onoda et al.

[11] 3,747,346
[45] July 24, 1973

[54] TEMPERATURE CONTROL SYSTEM FOR CATALYTIC CONVERTER

[75] Inventors: Michio Onoda, Yokohama; Saburo Usui; Tutomu Simizume, both of Yokosuka; Mitsuru Taguchi, Yokohama, all of Japan

[73] Assignee: Nissan Motor Company, Limited, Yokohama City, Japan

[22] Filed: Apr. 17, 1972

[21] Appl. No.: 244,550

[52] U.S. Cl. ............... 60/286, 23/288 F, 60/298
[51] Int. Cl. ............................................. F01n 3/14
[58] Field of Search ................ 60/274, 286, 282, 60/298, 320; 23/288 F

[56] References Cited
UNITED STATES PATENTS
| | | | |
|---|---|---|---|
| 3,168,806 | 2/1965 | Calvert | 60/286 |
| 3,606,753 | 9/1971 | La Force | 60/274 |
| 3,665,711 | 5/1972 | Muroki | 60/286 |

Primary Examiner—Douglas Hart
Attorney—John Lezdey, Robert S. Auten et al.

[57] ABSTRACT

A system for controlling the catalyst temperature of a catalytic converter mounted in an exhaust system of an internal combustion engine within a range appropriate for eliminating nitrogen oxides contained in engine exhaust gases. The system includes an encasing structure which is disposed about an exhaust pipe upstream of the catalytic converter and which is spaced from the exhaust pipe to form a gap into which an atmospheric air is selectively admitted. The encasing structure has air inlet and outlet passages communicating with the gap and opening to the atmosphere. The flow of atmospheric air into the gap is controlled by first and second valve plates operatively disposed in the air inlet and outlet passages respectively, the first and second valve plates being controlled by a control means comprising a diaphragm unit communicating with an intake manifold of the engine, a solenoid valve for controlling the fluid communication between the diaphragm unit and the intake manifold, and a temperature sensitive switch responsive to the catalyst temperature for controlling the solenoid valve.

1 Claim, 2 Drawing Figures

TEMPERATURE CONTROL SYSTEM FOR CATALYTIC CONVERTER

This invention relates in general to a catalytic converter for use with an exhaust system of an internal combustion engine for a motor vehicle and, more particularly, to a control system for maintaining the temperature of the catalyst in the catalytic converter within a range for satisfactorily eliminating the contents of nitrogen oxides in exhaust gases emitted from the internal combustion engine.

It is a principal object of the present invention to provide a control system for controlling the temperature of the catalyst in a catalytic converter used in an exhaust system of an internal combustion engine whereby the catalyst becomes fully effective within a relatively short period of time after starting of the internal combustion engine.

It is another object of the present invention to provide a control system for controlling the temperature of the catalyst in a catalytic converter used in an exhaust system of an internal combustion engine within a predetermined range for satisfactorily converting noxious and harmful nitrogen oxides in engine exhaust gases into harmless ones throughout varying operating conditions of the engine.

It is another object of the present invention to provide a control system for controlling the temperature of the catalyst in a catalytic converter used in an exhaust system of an internal combustion engine within a predetermined range in depedence on the catalyst temperature.

It is a further object of the present invention to provide a control system for controlling the temperature of the catalyst in a catalytic converter used in an exhaust system of an internal combustion engine, which system is simple in construction, economical to manufacture and easy to install in the exhaust system now in use.

Figure 2:
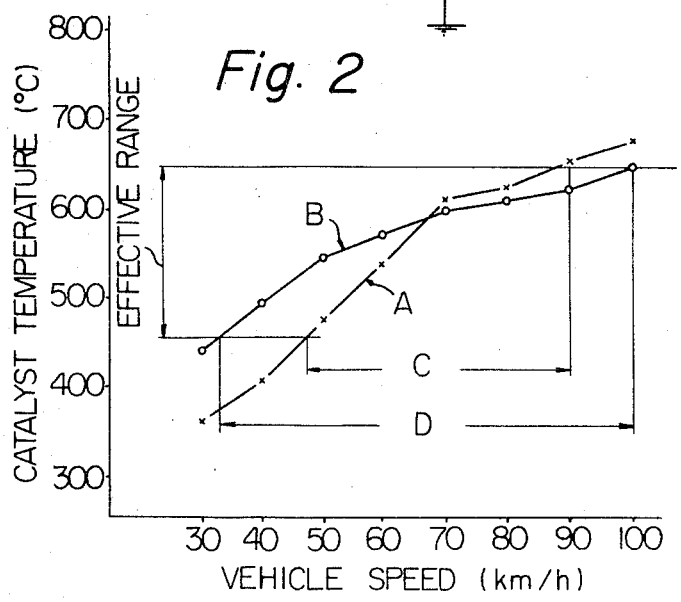

These and other objects and advantages of the present invention will become more apparent from the following description when taken in conjunction with the accompanying drawings, in which:

FIG. 1 is a schematic view of a control system for controlling the temperature of the catalyst in a catalytic converter implementing the present invention, the control system being shown as incorporated in an exhaust system of an internal combustion engine; and FIG. 2 is a graph showing examples of relationship between the vehicle speed and the temperature of the catalyst in the catalytic converter as attained in the system of FIG. 1.

Referring now to FIG. 1, there is schematically shown a preferred embodiment of the temperature control system according to the present invention. The temperature control system proposed by the present invention is specifically suited for use with an exhaust system of an internal combustion engine, which is generally designated by reference numeral 10. The internal combustion engine 10 has an intake manifold 12, through which an air-fuel mixture is supplied to engine cylinders (not shown). The internal combustion engine 10 also has an exhaust system 14 consisting of an exhaust manifold 16 leading from the engine cylinders (not shown) and an exhaust pipe 18 connected therewith.

As seen in FIG. 1, a catalytic converter 20 is located in the exhaust pipe 18 and has a catalyst (not shown) mounted therein whereby engine exhaust gases introduced thereinto are reduced to convert the nitrogen oxides into harmless ones before the engine exhaust gases escape to the atmosphere through the exhaust pipe 18. The catalytic converter 20 may be of any conventional construction insofar as it functions to reduce the noxious nitrogen oxides in the engine exhaust gases into harmless components and, accordingly, the detail construction of the same is herein omitted for the sake of simplicity of illustration.

The exhaust gases emitted from the engine cylinders (not shown) are passed into the exhaust manifold 16 downstream of the exhaust ports (not shown). The exhaust gases passed into the exhaust manifold 16 are then passed through the exhaust pipe 18 into the catalytic converter 20, where the noxious nitrogen oxides are converted into innocuous compounds. If, in this instance, the exhaust pipe 18 is direct contact with the atmospheric air, the exhaust gases are cooled off along the path thereof from the engine cylinders to the catalytic converter and relatively much time is required until the catalytic converter is heated to such an extent that the catalyst contained therein is fully effective to reduce nitrogen oxides in the engine exhaust gases into harmless ones. When, moreover, the engine is operating at a relatively high speed, the temperature of the exhaust gases reaches a high value so that the catalyst in the catalytic converter is exposed to excessive high temperature and frequent replacement of the catalyst is required.

According to the present invention, the temperature of the catalyst in the catalytic converter is maintained within an appropriate value throughout the varying operating conditions of the engine. To this end, an encasing structure 22 is disposed about the exhaust pipe 18 upstream of the catalytic converter 20 and spaced from the exhaust pipe 18 to form a gap 24 which functions to prevent heat loss from the exhaust pipe 18 and which permit the air to pass therethrough to prevent an excessive high temperature of the exhaust pipe 18. Preferably, the encasing structure 22 is cylindrical, however, it may be also formed to an oval configulation or have any other suitable shape. The walls of the encasing structure 22 may be insulated with fibrous or foamed insulation, if desired. The encasing structure 22 has an air inlet passage 26 formed at its upstream side and an air outlet passage 28 formed at its downstream side, the air inlet and outlet passages opening to the atmosphere and communicating with the gap 24 formed between the outer wall of the exhaust pipe 18 and the inner wall of the encasing structure 22. The flow of air passing through the gap 24, a first valve plate 30 is operatively disposed in the air inlet passage 26 and a second valve plate 32 is operatively disposed in the air outlet passage 28. The first and second valve plates 30 and 32 are mechanically connected with each other as shown by a broken line 34 in FIG. 1 so that the first and second valve plates 30 and 32 are simultaneously movable. The first valve element 30 is linked to and actuated by a diaphragm unit 36.

The diaphragm unit 36 communicates through conduits 38 and 40 with the intake manifold 12 so that the diaphragm unit 36 is responsive to the intake manifold vacuum to actuate the first and second valve plates 30 and 32. The diaphragm unit 36 may be of the type which has an atmospheric chamber vented to the atmosphere, a vacuum chamber communicating with the intake manifold 12 through the conduits 38 and 40, a diaphragm member interposed between the atmospheric chamber and the vacuum chamber and rigidly connected to the first valve plate 30, and the compression spring disposed in the vacuum chamber so that the diaphragm member is urged toward a position in which the first valve plate 30 and the second valve plate 32 are closed.

Interposed between the conduits 38 and 40 is a solenoid valve 42 which functions to provide or interrupt the fluid communication beween the conduits 38 and 40. The solenoid valve 42 may be of the type having a solenoid coil, a moving core or plunger and a valve spring, the plunger being normally kept seated so as to block the fluid communication between the conduits 38 and 40 by the force of the valve spring. One end of the solenoid coil is electrically connected through a line 44 to temperature sensitive switch 46 which is electrically connected to a source 48 of electric power supply. Another end of the solenoid coil is grounded by a line 50. The temperature sensitive switch 46 may be of conventional construction and communicates through a conduit 52 with the interior of the catalytic converter 20 at a point 54 to detect the temperature of the catalyst therein so that, when the temperature of the catalyst exceeds a predetermined value, the temperature sensitive switch 46 is switched on to energize the solenoid valve 42.

When, in operation, the temperature of the catalyst in the catalytic converter 20 reaches a predetermined value, the temperature sensitive switch 46 is switched on so that the solenoid valve 42 is actuated to provide the fluid communication between the conduits 38 and 40. When this takes place, the diaphragm unit 36 communicates with the intake manifold 12 and, therefore, the diaphragm member (not identified) thereof is caused to move by the action of the intake manifold vacuum to a position in which the first and second valve plates 30 and 32 are opened. Upon opening of these valve plates 30 and 32, the atmospheric air is admitted through the first air inlet passage 26 into the gap between the outer wall of the exhaust pipe 18 and the inner wall of the encasing structure 22, thereby cooling the exhaust pipe 18 and accordingly the catalyst in the catalytic converter 20. If, in this instance, the temperature of the catalyst in the catalytic converter 20 reaches a lower limit of a given temperature, then the temperature sensitive switch 46 is switched off to cause the solenoid valve 42 to interrupt the fluid communication between the conduits 38 and 40. Consequently, the diaphragm member of the diaphragm unit 36 is moved to a position in which the first and second valve plates 30 and 32 are closed thereby to prevent dissipation of heat from the exhaust pipe 18. Thus, the temperature of the catalyst in the catalytic converter 20 is maintained within a suitable range appropriate for reducing nitrogen oxides in the exhaust gases emitted from the internal combustion engine 10.

FIG. 2 illustrates an example of the relationship between the catalyst temperature and the vehicle speed. Curve A indicates the variation in the catalyst temperature as attained where a typical catalytic converter is used, and curve B represents the variations in the catalyst temperature as attained where the temperature control system of the present invention is incorporated in the typical catalytic converter. C represents the speed range at which the catalyst is effective to reduce the nitrogen oxides in the engine exhaust gases into harmless compounds where the conventional catalytic converter is used in the exhaust system of the engine, and D indicates the effective speed range where the temperature control system of the present invention is incorporated in the exhaust system.

It will now be understood from the foregoing description that according to the present invention, the catalyst temperature of the catalytic converter is maintained within a suitable range proper for eliminating nitrogen oxides contained in the engine exhaust gases.

What is claimed is:

1. A control system for use with an exhaust system of an internal combustion engine having an intake manifold, an exhaust manifold and an exhaust pipe leading from said exhaust manifold and adapted for controlling the temperature of a catalyst contained in a catalytic converter mounted in said exhaust pipe, said control system comprising an encasing structure disposed about said exhaust pipe upstream of said catalytic converter and spaced from said exhaust pipe to form a gap between said encasing structure and said exhaust pipe, an air inlet passage formed at an upstream side of said encasing structure, an air outlet passage formed at a downstream side of said encasing structure, said air inlet and outlet passages opening to the atmosphere and communicating with said gap formed between said exhaust pipe and said encasing structure, first and second valve plates operatively disposed in said air inlet and outlet passages respectively and mechanically connected to each other, diaphragm means linked to said first valve plate for actuating the same, first and second conduit means for connecting said diaphragm means to said intake manifold, a source of electric power supply, solenoid valve means interposed between said first and second conduit means and connected to said source of electric power supply for controlling the fluid communication between said first and second conduit means, and temperature sensitive switch means located between said source of electric power supply and said solenoid valve means and communicating with said catalytic converter, said temperature sensitive switch means being responsive to the temperature of said catalyst in said catalytic converter, whereby, when the catalyst temperature exceeds a predetermined value, said temperature sensitive switch means is switched on to energize said solenoid valve means to provide the fluid communication between said first and second conduit means thereby to cause said diaphragm means to move said first and second valve plates in their open position to admit the atmospheric air into said gap for thereby maintaining the temperature of said catalyst within a certain range.

* * * * *